United States Patent Office 3,563,112
Patented Feb. 16, 1971

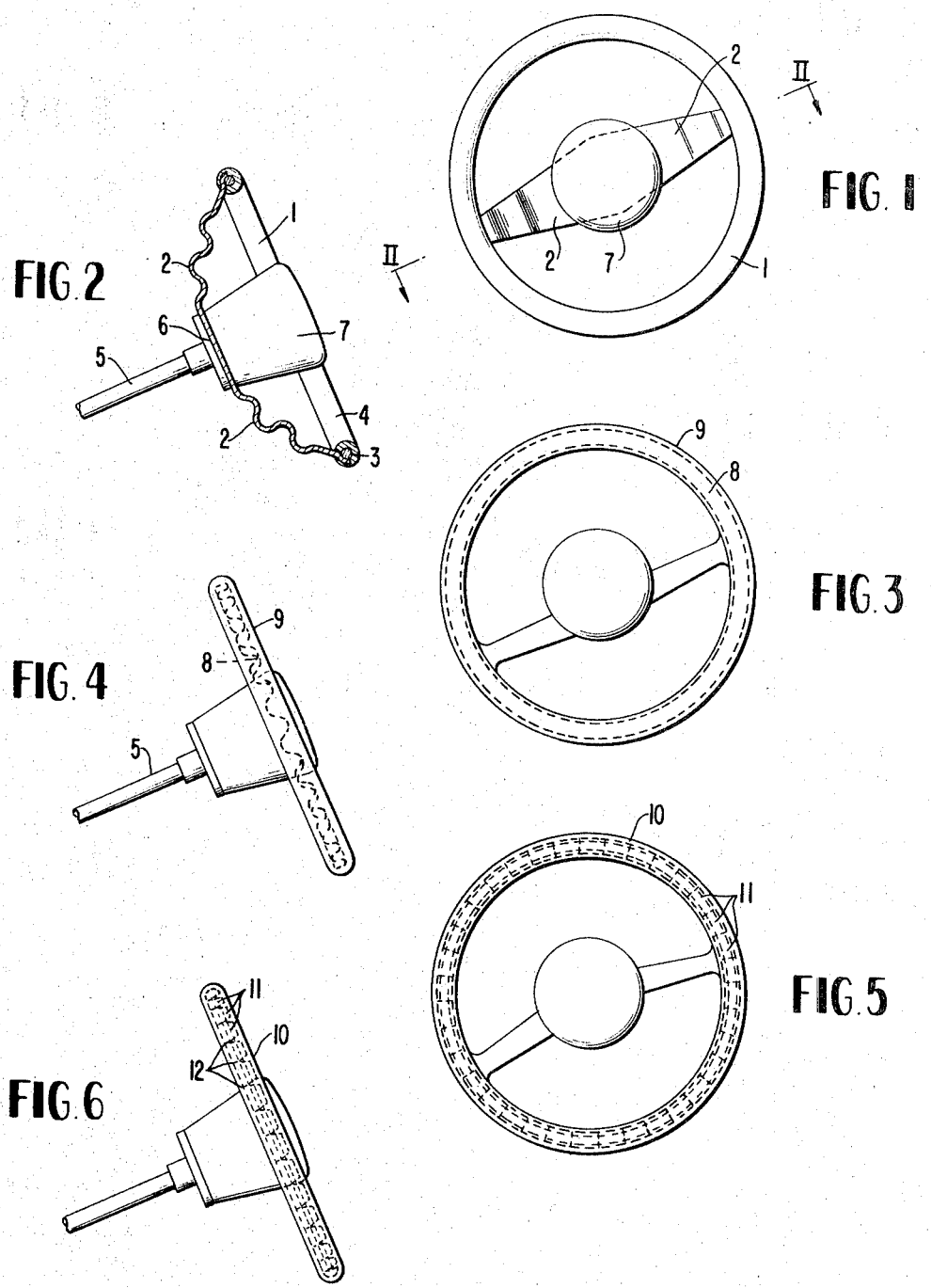

3,563,112
SAFETY STEERING WHEEL FOR MOTOR VEHICLES
Karl Wilfert, Gerlingen-Waldstadt, Germany, assignor to Daimler-Benz Aktiengesellschaft, Stuttgart, Germany
Filed Sept. 18, 1968, Ser. No. 760,512
Claims priority, application Germany, Sept. 19, 1967,
P 16 30 355.2
Int. Cl. B62d 1/04
U.S. Cl. 74—552          10 Claims

ABSTRACT OF THE DISCLOSURE

A safety steering wheel for motor vehicles, especially passenger motor vehicles in which the steering wheel rim and/or the steering wheel spokes have a smaller form-rigidity in the direction of the steering column than in the direction of the normal steering forces.

---

The present invention relates to a safety steering wheel for motor vehicles, especially for passenger motor vehicles.

During collisions of motor vehicles, the steering wheel, particularly the steering wheel rim, frequently causes serious injuries on the part of the driver. This rests, above all, on the fact that the steering wheels are constructed excessively rigid and do not yield during an impact of the driver. The present invention aims at avoiding this disadvantage. It essentially consists in that the steering wheel rim and/or the steering wheel spokes have a lesser form-rigidity in the direction of the steering column than in the radial direction. By this measure, the injury danger for the driver is reduced whereas the transmission of steering forces is assured and made possible in a safe and reliable manner.

An extraordinarily advantageous type of construction of the present invention is obtained if the core of the steering wheel rim and/or the steering wheel spokes consist of undulated band steel. Such type of undulated band steel has a great form-rigidity only in one load direction.

In order to further reduce the danger of injury, the steering wheel rim and/or the steering wheel spokes may be surrounded at least in part by foamed synthetic resinous material that may be appropriately molded about the same. In order to achieve that the steering wheel rim exhibits a slight form-rigidity only in the direction of the steering column—forwardly as viewed from the driver—whereas it is far-reachingly rigid in the opposite direction, link element consisting preferably of synthetic resinous material may be arranged on the inside of the steering rim which—as viewed from the driver—abut against each other with parallel surfaces only below the neutral axis of the steering wheel rim. A particularly advantageous local deformability in a preferred direction results from this type of construction whereby in case of an impact of a body part, the steering wheel rim adapts itself to the same and thereby reduces the danger of injury.

Accordingly, it is an object of the present invention to provide a safety steering wheel for motor vehicles which avoids by extremely simple means the aforementioned shortcomings and drawbacks encountered in the prior art.

Another object of the present invention resides in a safety steering wheel for motor vehicles in which serious injuries are considerably minimized by a steering wheel rim that is able to yield and/or adapt itself in case of an impact of a body part of the driver.

A further object of the present invention resides in a safety steering wheel for motor vehicles, especially passenger motor vehicles which has a lesser form-rigidity in the direction of the steering column than in the radial direction so that it is able to yield in case of impact while at the same time transmitting safely all steering forces.

These and other objects, features, and advantages of the present invention will become more obvious from the following description when taken in connection with the accompanying drawing which shows, for purposes of illustration only, several embodiments in accordance with the present invention, and wherein:

FIG. 1 is a plan view on a safety steering wheel in accordance with the present invention;

FIG. 2 is a cross-sectional view taken along line II—II of FIG. 1;

FIG. 3 is a plan view on a further modified embodiment of a safety steering wheel according to the present invention;

FIG. 4 is a side elevational view of the safety steering wheel according to FIG. 3;

FIG. 5 is a plan view on a third embodiment of a safety steering wheel in accordance with the present invention; and FIG. 6 is a side view of the safety steering wheel according to FIG. 5.

Referring now to the drawing wherein like reference numerals are used throughout the various views to designate like parts, the safety steering wheel illustrated in FIG. 1 consists of a steering wheel rim 1 and of two steering wheel spokes 2. The steering wheel rim 1 is constructed in a conventional manner and consists of a metal ring 3 which is surrounded by foamed material such as a synthetic resinous material mass 4 suitably molded about the same. The two spokes 2 are formed by an undulated band steel which is secured at the steering column 5 that is disposed lower compared to the steering wheel rim 1. A padding 7 in the form of a truncated cone extends from the steering wheel hub 6 approximately up to the plane of the steering wheel rim 1 which padding protects the driver against injuries by the steering column 5. The direction of undulations of the band steel is so selected that the steering wheel spokes 2 have a considerably smaller form-rigidity in the direction of the steering column 5 that in the radial or circumferential direction. It is thus achieved that in case of an impact of the driver against the steering wheel rim 1, the steering wheel spokes which are relatively soft in the direction of the steering column 5 and therewith the steering wheel rim 1 yield whereas the steering forces are nonetheless safely transmitted prior to an accident.

In the embodiment according to FIG. 3, the core 8 of the steering wheel rim 9 consisting preferably of conventional synthetic resinous material is made from undulated band steel. It is made possible thereby that the steering wheel rim 9 yields in the direction of the steering wheel column 5 in case of an impact of the driver because it possesses a smaller form rigidity in this direction. Steering wheel spokes corresponding to the embodiment according to FIG. 1 may be used additionally with this embodiment.

The embodiment according to FIG. 5 shows an extraordinarily advantageous construction of a steering wheel rim 10. Individual synthetic resinous material elements 11 are provided on the inside of the steering wheel rim 10 which abut against each other with parallel surfaces 12 only below the neutral axis of the steering wheel rim 10. The slight form-rigidity of the steering wheel rim 10 is thereby limited to a direction which appropriately lies in the direction of the steering column 5 as viewed from the driver. It is particularly advantageous that this great yieldingness of the steering wheel rim 10 in the direction of the steering wheel column 5 effects that in case of an impact of a body part of the driver against the steering wheel rim 10, the latter adapts itself to the shape of the body part and therewith reduces the danger of injury. Nevertheless, the full transmission capability for the steering forces is preserved. This steering wheel rim 10 is to be considered rigid in the direction toward the driver. As a result thereof, tension forces can be absorbed without difficulty by the steering wheel rim 10 which may be applied by the driver to the steering wheel rim 10, for example, when boarding or when straightening out clothing.

For the further increase of the safety, the steering wheel spokes and the steering wheel rims of the embodiments according to FIGS. 1 to 6 may be entirely or partly surrounded by conventional foamed material suitably applied about the same.

While I have shown and described only several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A safety steering wheel for motor vehicles, especially passenger motor vehicles, which includes a steering wheel rim and steering wheel spoke means, characterized in that said steering wheel rim which includes a core has a smaller form-rigidity in the direction of the steering column than in the normal steering direction, and at least one of the two parts consisting of said core and of said steering wheel spoke means being made from undulated band steel, wherein said core comprises a plurality of elements arranged within the steering wheel rim which abut each other with substantial parallel surfaces only below the neutral axis of the steering wheel rim, as viewed from the driver.

2. A safety steering wheel according to claim 1, wherein said elements are made from synthetic resinous material.

3. A safety steering wheel for motor vehicles, especially passenger motor vehicles, which includes a steering wheel rim having a core and steering wheel spoke means, characterized in that both said steering wheel rim and said steering wheel spoke means have a smaller form-rigidity in the direction toward the steering column than in the normal steering direction, and at least one of the two parts consisting of said core and of said steering wheel spoke means being made from undulated band steel, wherein said core comprises a plurality of elements arranged within the steering wheel rim which abut against each other with substantial parallel surfaces only below the neutral axis of the steering wheel rim, as viewed from the driver.

4. A safety steering wheel according to claim 3, wherein at least one of the two parts consisting of steering wheel rim and of steering wheel spoke means are at least partly surrounded by foamed material.

5. A safety steering wheel for motor vehicles, especially passenger motor vehicles, which includes a steering wheel rim and steering wheel spoke means, characterized in that said steering wheel rim which includes a core has a smaller form-rigidity in the direction of the steering column than in the normal steering direction, and at least said core being made from undulated band steel.

6. A safety steering wheel for motor vehicles, especially passenger motor vehicles, which includes a steering wheel rim having a core and steering wheel spoke means, characterized in that both said steering wheel rim and said steering wheel spoke means have a smaller form-rigidity in the direction toward the steering column than in the normal steering direction, and at least said core means being made from undulated band steel.

7. A safety steering wheel according to claim 6 wherein both said core and the steering wheel spoke means consist of undulated band steel.

8. A safety steering wheel according to claim 5 wherein at least one of the two parts consisting of steering wheel rim and of steering wheel spoke means are at least partly surrounded by foamed material.

9. A safety steering wheel according to claim 8, wherein said foamed material is a synthetic resinous foamed material.

10. A safety steering wheel according to claim 9, wherein both said steering wheel rim and said steering wheel spoke means are surrounded by foamed material.

References Cited

UNITED STATES PATENTS

| | | | |
|---|---|---|---|
| 2,100,147 | 11/1937 | Oehmen | 74—552 |
| 2,185,568 | 1/1940 | Ratner | 264—45 |
| 2,210,232 | 8/1940 | Crockett | 74—552 |
| 2,298,596 | 10/1942 | Schrantz | 74—558 |
| 2,327,931 | 8/1943 | Ratner | 264—45 |
| 2,765,674 | 10/1956 | Robards | 74—552 |
| 2,894,413 | 7/1959 | Schmid | 74—552 |
| 3,020,661 | 2/1962 | Miller et al. | 74—552UX |
| 3,055,231 | 9/1962 | Daniel | 74—552 |
| 3,087,352 | 4/1963 | Daniel | 74—552 |
| 3,209,615 | 10/1965 | Fosnaugh et al. | 74—552 |
| 3,312,124 | 4/1967 | Meier et al. | 74—558 |
| 3,321,996 | 5/1967 | Cardinale | 74—552 |
| 3,435,701 | 4/1969 | Bucher | 74—552 |
| 3,456,526 | 7/1969 | Brilmyer | 74—552 |

FOREIGN PATENTS

| | | | |
|---|---|---|---|
| 657,576 | 1/1929 | France | 74—552 |

FRED C. MATTERN, JR., Primary Examiner

F. D. SHOEMAKER, Assistant Examiner